(12) United States Patent
Asakawa et al.

(10) Patent No.: US 6,892,128 B2
(45) Date of Patent: May 10, 2005

(54) CONTROL APPARATUS FOR HYBRID VEHICLE

(75) Inventors: Masanobu Asakawa, Utsunomiya (JP); Manabu Niki, Utsunomiya (JP); Kohei Hanada, Utsunomiya (JP); Minoru Suzuki, Shimotsuga-gun (JP); Teruo Wakashiro, Shioya-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/880,557

(22) Filed: Jul. 1, 2004

(65) Prior Publication Data

US 2005/0003927 A1 Jan. 6, 2005

(30) Foreign Application Priority Data

Jul. 4, 2003 (JP) ......................................... 2003-192313

(51) Int. Cl.[7] ............................... B60K 1/02; G06F 7/00
(52) U.S. Cl. ............................. 701/103; 701/104; 477/5
(58) Field of Search ................................ 701/103, 104; 477/3, 5; 123/198 F

(56) References Cited

U.S. PATENT DOCUMENTS

| 5,713,814 A | * | 2/1998 | Hara et al. ........................ 477/5 |
| 2004/0149502 A1 | * | 8/2004 | Itoh et al. ..................... 180/65.2 |
| 2005/0000479 A1 | * | 1/2005 | Niki et al. ................. 123/90.15 |
| 2005/0003926 A1 | * | 1/2005 | Hanada et al. ................... 477/3 |

FOREIGN PATENT DOCUMENTS

| JP | 9-163509 | 6/1997 |
| JP | 2001-208177 | 8/2001 |
| JP | 2002-161775 | 6/2002 |
| JP | 2002-204506 | 7/2002 |
| JP | 2002-247707 | 8/2002 |

\* cited by examiner

*Primary Examiner*—Hieu T. Vo
(74) *Attorney, Agent, or Firm*—Arent Fox PLLC

(57) ABSTRACT

An FI/AT/MGECU in a control unit calculates an EV travel capable battery terminal discharge power which is the dischargeable power from a battery during EV travel which is travel under the driving force from the motor, according to a state of charge of the battery and a vehicle travelling speed. Based on the calculated EV travel capable battery terminal discharge power and a predetermined limit value, an energy management charge-discharge required battery terminal power is calculated. Then an energy management charge-discharge required torque corresponding to the energy management charge-discharge required battery terminal power, that is the motor torque capable of being output, is calculated based on; a predetermined PDU-MOT overall efficiency efima which is the conversion efficiency of the electric power and the motive power between the power drive unit and the motor, a rotation frequency of the motor, and a predetermined torque limit value for protecting the motor.

2 Claims, 9 Drawing Sheets

CONTROL APPARATUS FOR HYBRID VEHICLE

BACKGROUND OF THE INVENTION

1. Field of the Invention

The present invention relates to a control apparatus for a hybrid vehicle which is mounted in a hybrid vehicle propulsion driven by jointly using an internal-combustion engine and a motor, and wherein the driving force from at least one of the internal-combustion engine and the motor is transmitted to the driving wheels.

This application is based on Japanese Patent Application No. 2003-192313, the contents of which are incorporated herein by reference.

2. Description of Related Art

Conventionally, for example, in a hybrid vehicle which comprises an internal-combustion engine and a motor as a power source and wherein the driving force from at least one of the internal-combustion engine and the motor is transmitted to the driving wheels for propulsion, a control apparatus for a hybrid vehicle has been well known which calculates the throttle opening for minimizing the fuel consumption of the internal-combustion engine with respect to the rotation frequency of the input shaft of the transmission, and based on this throttle opening and the accelerator operation amount of a driver, allocates the torque required by the power plant (that is, the internal-combustion engine and the motor), into the engine torque required by the internal-combustion engine and the motor torque required by the motor (for example, refer to Patent Document 1: Japanese Unexamined Patent Application, First Publication No. Hei 9-163509).

Incidentally, in the control apparatus for a hybrid vehicle according to an example of the above conventional technique, there is concern that for example, in an executing state for fuel cut (F/C) which cancels the fuel supply to the internal-combustion engine due to the regenerative operation of motor and the accelerator operation amount of driver being a value of zero or in the vicinity of zero, if the setting is to shift to the F/C resetting state which restarts the fuel supply at the time when an increase in the accelerator operation amount of driver is detected, fuel consumption efficiency may be deteriorated.

That is, even in the case where the increase in the accelerator operation amount of driver is detected during the regenerative operation of the motor, for example if the vehicle is in the decelerating state, the regenerative operation of the motor is continued, resulting in a problem in that the internal-combustion engine is unnecessarily started.

SUMMARY OF THE INVENTION

The present invention takes the above situation into consideration, with the object of providing a control apparatus for a hybrid vehicle in which fuel consumption efficiency can be improved.

In order to solve the above problem and achieve the related object, a first aspect of the present invention is a control apparatus for a hybrid vehicle which comprises an internal-combustion engine and a motor as a power source, and a power storage unit which transfers electric energy with the motor (for example, a battery 3 in an embodiment), and at least one of the internal-combustion engine and the motor is connected to driving wheels of the vehicle through a transmission so as to transmit a driving force to the driving wheels, wherein the control apparatus comprises: a motor chargeable-dischargeable torque calculating device (for example, step S31 to step S33 in the embodiment) which calculates a motor chargeable-dischargeable torque which is the motor torque capable of being output from the motor (for example, the energy management charge-discharge required torque TQMEMREQ in the embodiment) corresponding to the chargeable-dischargeable power in the power storage unit (for example, the energy management charge-discharge required battery terminal power PWBEMREQ in the embodiment), according to the energy state in high voltage electrical equipment constituting the power storage unit and accessories; a fuel supply canceling device (for example, step S53 and step S56 in the embodiment) which cancels the fuel supply to the internal-combustion engine in the case where a target torque (for example, the power plant required torque final value TQPPRQF in the embodiment) with respect to a crank end torque which is the torque at the shaft end of the crankshaft, of the power plant torque output from the power plant comprising the internal-combustion engine and the motor, is less than a value obtained by adding the motor chargeable-dischargeable torque and a minimum engine torque capable of being output from the internal-combustion engine; and a motor required torque setting device (for example, step S53 and step S56 concurrently held in the embodiment) which sets a motor required-torque which is a required value with respect to the motor torque according to the target torque when the fuel supply to the internal-combustion engine is cancelled by the fuel supply cancellation.

According to the control apparatus for a hybrid vehicle of the above construction, for example, according to the energy state of the high voltage electrical equipment such as the state of charge of the power storage unit, and for example the travelling state of the vehicle comprising the accelerator pedal opening, vehicle speed, and the engine speed NE, the motor chargeable-dischargeable torque is calculated. Then based on this motor chargeable-dischargeable torque, it is determined whether the fuel supply to the internal-combustion engine is cancelled or not. As a result, the operation of the internal-combustion engine may be canceled and the fuel consumption efficiency may be improved while maintaining the desired torque. That is, in the cancellation state of the fuel supply, by increasing or decreasing the motor torque requested value according to the increasing or decreasing in the target torque, the motor is regeneratively operated when decelerating the vehicle, and the motor is power operated for example when driving the vehicle. Hence, EV travel traveling only with the motor as a power source may be performed. Therefore, even in the cancellation state of the fuel supply, by changing the motor torque required value, the regeneration amount and the driving force of the motor may be changed and the driver's intention may be appropriately reflected with respect to the travelling behavior of the vehicle.

Furthermore, a second aspect of the present invention is a control apparatus for a hybrid vehicle which comprises; a power storage unit state detecting device which detects the state of the power storage unit (for example, a battery temperature sensor S8 and HVECU 35 in the embodiment); a vehicle state detecting device which detects the state of the vehicle (for example, a vehicle speed sensor S1, an engine speed sensor S2, and an accelerator pedal opening S5 in the embodiment); an EV travel determination device which determines whether it is possible to execute EV travel which makes the vehicle travel under the driving force of the motor by means of discharge power of the power storage unit or not, based on the state of the power storage unit detected by the power storage unit state detecting device and the state of the vehicle detected by the vehicle state detecting device; a power calculating device (for example, step S12 to step S20 in the embodiment) which calculates the chargeable-dischargeable power at input-output terminals of the power storage unit (for example, an energy management charge-discharge required battery terminal power PWBEMREQ in the embodiment) in an executing state of the EV travel according to the energy state of the high voltage electrical equipment and the travelling state of the vehicle; an upper limit motor torque calculating device (for example, step S31 to step S33 in the embodiment) which calculates an EV travel capable upper limit motor torque which is an upper limit in the executing state of the EV travel (for example, the energy management charge-discharge required torque TQMEMREQ in the embodiment) by calculating a value obtained by subtracting the power consumption of the accessories from the dischargeable power, with the conversion efficiency of the electric power and the motive power; and an EV travel controlling device (for example, step S53 and step S56 in the embodiment) which controls the EV travel in the case where the execution of EV travel is approved by the EV travel determination device and the target torque is less than the value obtained by adding the EV travel capable upper limit motor torque and the minimum engine torque.

According to the control apparatus for a hybrid vehicle of the above construction, the EV travel determination device, determines for example whether it is possible to execute the EV travel according to the state of the power storage unit such as the state of charge or the temperature of the power storage unit, and the state of the vehicle such as the vehicle speed, the engine speed, and the shift position. Therefore, even while the vehicle is travelling, the operation of the internal-combustion engine can be properly canceled and the fuel consumption efficiency can be improved.

Furthermore, in addition to the determination result by the EV travel determination device, by executing the EV travel according to the EV travel capable upper limit motor torque calculated based on the energy state of the high voltage electrical equipment, the travelling state of the vehicle, the power consumption of the accessories, and the conversion efficiency of the electric power and the motive power, the driver's intention can be appropriately reflected with respect to the travelling state of the vehicle while maintaining the desired torque.

DETAILED DESCRIPTION OF THE INVENTION

Hereunder is a description of a control apparatus for a hybrid vehicle according to an embodiment of the present invention with reference to the appended drawings.

Figure 1:
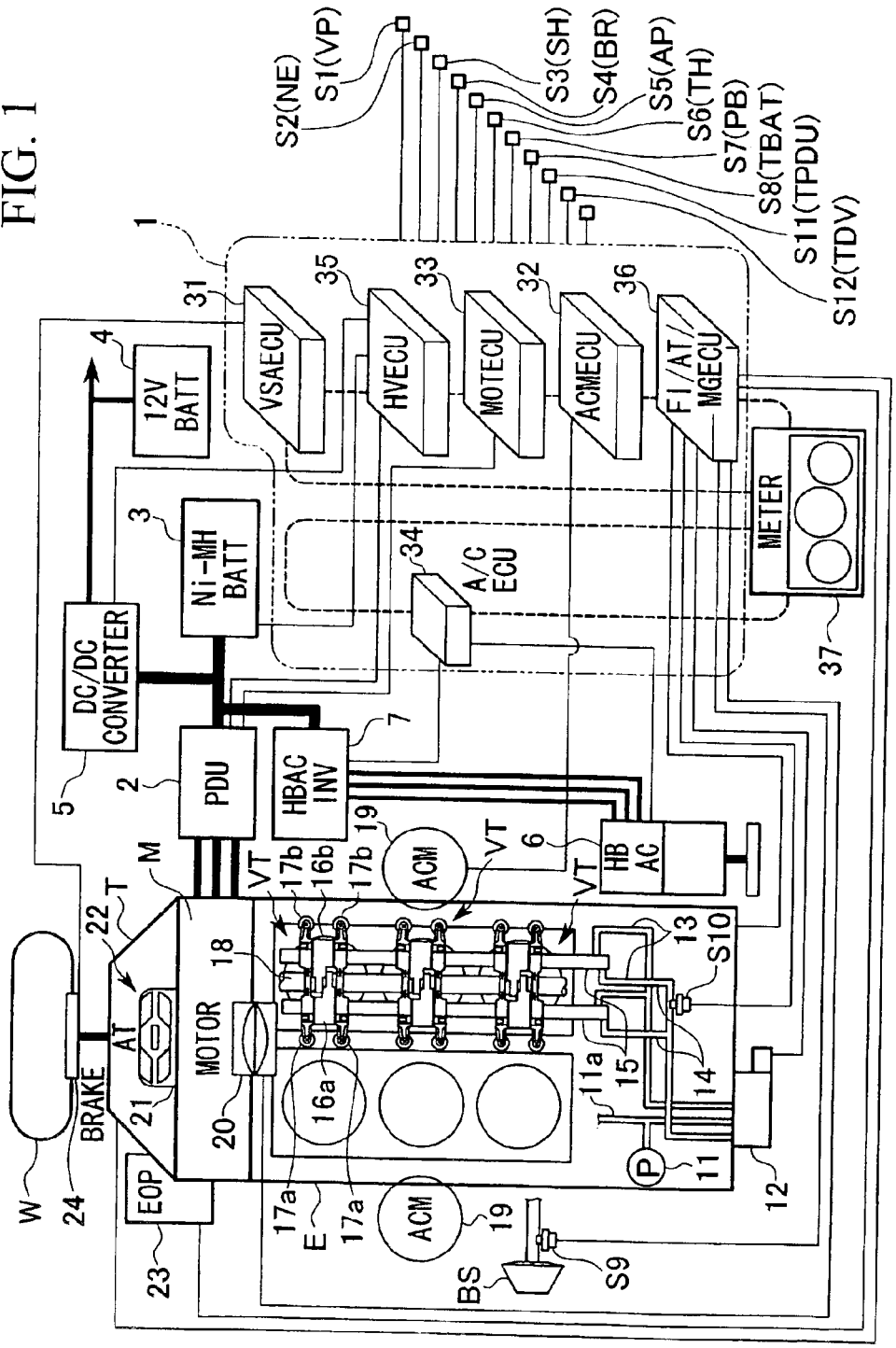
FIG. 1 shows a construction of a control apparatus for a hybrid vehicle according to an embodiment of the present invention.

FIG. 1 shows a parallel hybrid vehicle according to the embodiment of this invention having a construction where an internal-combustion engine E, a motor M, and a transmission T are connected directly in series. The driving force of both the internal-combustion engine E and the motor M is transmitted, for example, from the transmission T such as an automatic transmission (AT) or manual transmission (MT),) to the driving wheels W of the vehicle, via a differential gear (not shown) which distributes the driving force between driving wheels W on the right and the left (front wheels or rear wheels. Moreover, when a driving force is transmitted from the driving wheel W side to the motor M side at the time of deceleration of the hybrid vehicle, the motor M functions as a generator to generate so-called regenerative braking, and the kinetic energy of the vehicle body is recovered as electrical energy.

The motor M, being for example a three-phase brushless DC motor or the like, is connected to a power drive unit (PDU) 2. The power drive unit 2 comprises, for example a PWM inverter involving pulse width modulation (PWM), installed with a bridge circuit being a bridge connected using a plurality of transistor switching elements, and is connected to a nickel-hydrogen battery (battery) 3 of a high voltage system which transfers the power for the motor M (the power supply which is supplied to the motor M during the power running operation (driving or assisting) of the motor M, or the regenerated power which is output from the motor M during the regenerative operation). Moreover, the drive and regenerative operation are performed by the power drive unit 2 receiving control instructions from a control unit 1. That is, for example when driving the motor M, based on torque instructions input from the control unit 1, the power drive unit 2 converts the DC power output from the battery 3 into three-phase AC power and supplies this to the motor M. On the other hand, during the regenerative operation of the motor M, the three-phase AC power output from the motor M is converted into the DC power and the battery 3 is charged.

Furthermore, an auxiliary battery 4 of 12 volts for driving various accessories, is connected to the power drive unit 2 and the battery 3 in parallel via a downverter 5 which is a DC-DC converter. The downverter 5 is controlled by the control unit 1 and charges the auxiliary battery 4 by lowering the voltage of the power drive unit 2 or the battery 3.

Moreover, a crankshaft of the internal-combustion engine E is connected, for example through a belt or a clutch to a rotation shaft of an air conditioning motor (not shown) equipped in a hybrid air conditioning compressor (HBAC) 6. This air conditioning motor is connected to an air conditioning inverter (HBAC INV) 7. The air conditioning inverter 7 is connected in parallel to the power drive unit 2 and the battery 3, and under the control of the control unit 1, converts the DC power output from the power drive unit 2 and the battery 3 into three-phase AC power to supply to the air conditioning motor so as to drive control the hybrid air conditioning compressor 6.

That is, in the hybrid air conditioning compressor 6, the driving load, for example the discharge of the refrigerant, is variably controlled under the driving force from at least one of the internal-combustion engine E and the air conditioning motor during the power running operation of the air conditioning motor. Here, "hybrid" in the hybrid air conditioning compressor 6 means that it can be driven by either one of the internal-combustion engine E and the motor M.

Between the internal-combustion engine E and the air conditioning motor, there are for example, a crankshaft pulley integrally provided with the crankshaft of the internal-combustion engine E, a driving shaft pulley paired with the crankshaft pulley and integrally provided with a driving shaft connectable with the rotation shaft of the air conditioning motor through a clutch, and a belt spanning between the crankshaft pulley and the driving shaft pulley. That is, between the crankshaft pulley and the driving shaft pulley, the driving force is transmitted through the belt.

Moreover, the internal-combustion engine E is a so-called SOHC V6 cylinder engine, of a construction having three cylinders on one bank comprising a variable valve timing mechanism VT enabling a cylinder deactivation operation, and a construction having three cylinders on the other bank comprising a normal valve operating mechanism (not shown) which does not perform the cylinder deactivation operation. Furthermore, the three cylinders enabling the cylinder deactivation operation have a construction such that respective two inlet valves and two exhaust valves are able to maintain the closed state by means of the variable timing mechanism VT, via an oil pressure pump 11, a spool valve 12, a cylinder deactivation side path 13, and a cylinder deactivation cancellation side path 14. That is, the internal-combustion engine E may be switched between three cylinders operation (cylinder deactivation operation) in the state such that the three cylinders on one side bank are deactivated, and six cylinders operation (all cylinders operation) such that all six cylinders on both side banks are driven.

Specifically, if operating oil being supplied from the oil pressure pump 11 through the lubrication system piping Ha to the engine lubrication system is partially supplied via the spool valve 12 comprising a solenoid controlled by the control unit 1, to the cylinder deactivation side path 13 on the bank capable of cylinder deactivation operation, a cam lift rocker arm 16a (16b) and valve drive rocker arms 17a (17b) which are supported on the respective rocker shafts 15 and were integrally driven, are able to be driven separately. Therefore, the driving forces of the cam lift rocker arms 16a and 16b driven by the rotation of the cam shaft 18 are not transmitted to the valve drive rocker arms 17a and 17b, so that the inlet valves and the exhaust valves remain in the closed state. Accordingly the cylinder deactivation operation where the inlet valves and the exhaust valves of the three cylinders become in the closed state may be performed. The internal-combustion engine E is mounted via a damping device (ACM: Active Control Engine Mount) 19 onto the vehicle so that the damping device 19 can suppress the generation of vehicle vibration accompanied with the operating state of the internal-combustion engine E, that is the switching of the three cylinders operation (cylinder deactivation operation) and the six cylinders operation (all cylinders operation).

Moreover, this internal-combustion engine E comprises an electronic throttle control system (ETCS) 20 which electronically controls a throttle valve (not shown).

The ETCS 20 drives an ETCS driver according to the throttle opening calculated in the control unit 1 based for example on the accelerator pedal opening related to the operating amount of the accelerator pedal (not shown) by a driver, the operating state of the vehicle such as the vehicle travelling speed (vehicle speed) VP or the engine speed NE, and on the torque distribution between the internal-combustion engine E and the motor M, so as to directly control the throttle valve.

For example the transmission T being the automatic transmission (AT) is constructed to comprise a torque converter 22 equipped with a lock-up clutch (LC) 21, and an electric oil pump 23 which generates the oil pressure for drive controlling the torque converter 22 and for the shifting operation of the transmission T. The electric oil pump 23 is drive controlled by the control unit 1 with the power supply from the battery 3.

The torque converter 22 transmits the torque by a spiral flow of the operating oil (ATF: Automatic Transmission Fluid) enclosed inside. In an LC_OFF state where the engagement of the lock-up clutch 21 is cancelled, the torque is transmitted (for example, amplification transmission) from the rotation shaft of the motor M to the input shaft of the transmission T via the operating oil.

Furthermore, in an LC_ON state where the lock-up clutch 21 is set up in the engagement state, the rotation driving force is directly transmitted from the rotation shaft of the motor M to the input shaft of the transmission T and not via the operating oil.

Moreover, a booster BS is linked to the brake pedal (not shown). A master power internal negative pressure sensor S9 which detects the brake master power internal negative pressure is provided in the booster BS.

Moreover, the driving wheel W comprises a brake device 24. The brake device 24 suppresses the generation of rapid behavioral change of the vehicle by control of the control unit 1. For example, it prevents slipping of the driving wheel W on a slippery road surface or the like, suppresses side slip such as oversteering or understeering, prevents the driving wheel W from being in a locked state during braking, ensures the desired driving force and the steering performance of the vehicle, stabilizes the posture of the vehicle, and assists with travelling by means of a creep force, for example, prevents the vehicle from moving backward on a slope when deactivating the internal-combustion engine E.

Inputs to the control unit 1 are: for example: a detection signal from a vehicle speed sensor S1 which detects the travelling speed of the vehicle VP, a detection signal from an engine speed sensor S2 which detects the engine speed NE, a detection signal from a shift position sensor S3 which detects the shift position SH of the transmission T, a detection signal from a brake switch S4 which detects the operating state BR of the brake (Br) pedal, a detection signal from an accelerator pedal opening sensor S5 which detects the accelerator pedal opening AP according to the operation amount of the accelerator pedal, a detection signal from a throttle opening sensor S6 which detects the throttle opening TH, a detection signal from an intake pipe pressure sensor S7 which detects the intake pipe pressure PB, a detection signal from a battery temperature sensor S8 which detects the temperature TBAT of the battery 3, a detection signal from the master power internal negative pressure sensor S9, a detection signal from a POIL sensor S10 which detects the oil pressure of the cylinder deactivation cancellation side path 14 when deactivating the cylinders, a detection signal from a PDU temperature sensor S11 which detects the temperature TPDU of the power drive unit 2, and a detection signal from a DV temperature sensor S12 which detects the temperature TDV of the downverter 5.

Moreover, the control unit 1 comprises: for example: a VSA (Vehicle Stability Assist) ECU 31 which drive controls the brake device 24 to stabilize the behavior of the vehicle, an ACMECU 32 which drive controls the damping device 19 to suppress the generation of car body vibration caused by the operating state of the internal-combustion engine E, a MOTECU 33 which controls the driving and the regenerative operation of the motor M, an A/CECU 34 which drive controls the air conditioning hybrid air conditioning compressor 6 and the air conditioning inverter 7, and an HVECU 35 which monitors and protects the high voltage electrical equipment system comprising for example the power drive unit 2, the battery 3, the downverter 5, and the motor M, and controls the operation of the power drive unit 2 and the downverter 5, and a FI/AT/MGECU 36. The respective VSAECU 31 to 36 are mutually connected communicably. The respective ECUs 31 to 36 are connected to a meter 37 comprising instruments which display the amount of the respective types of states.

Figure 2:
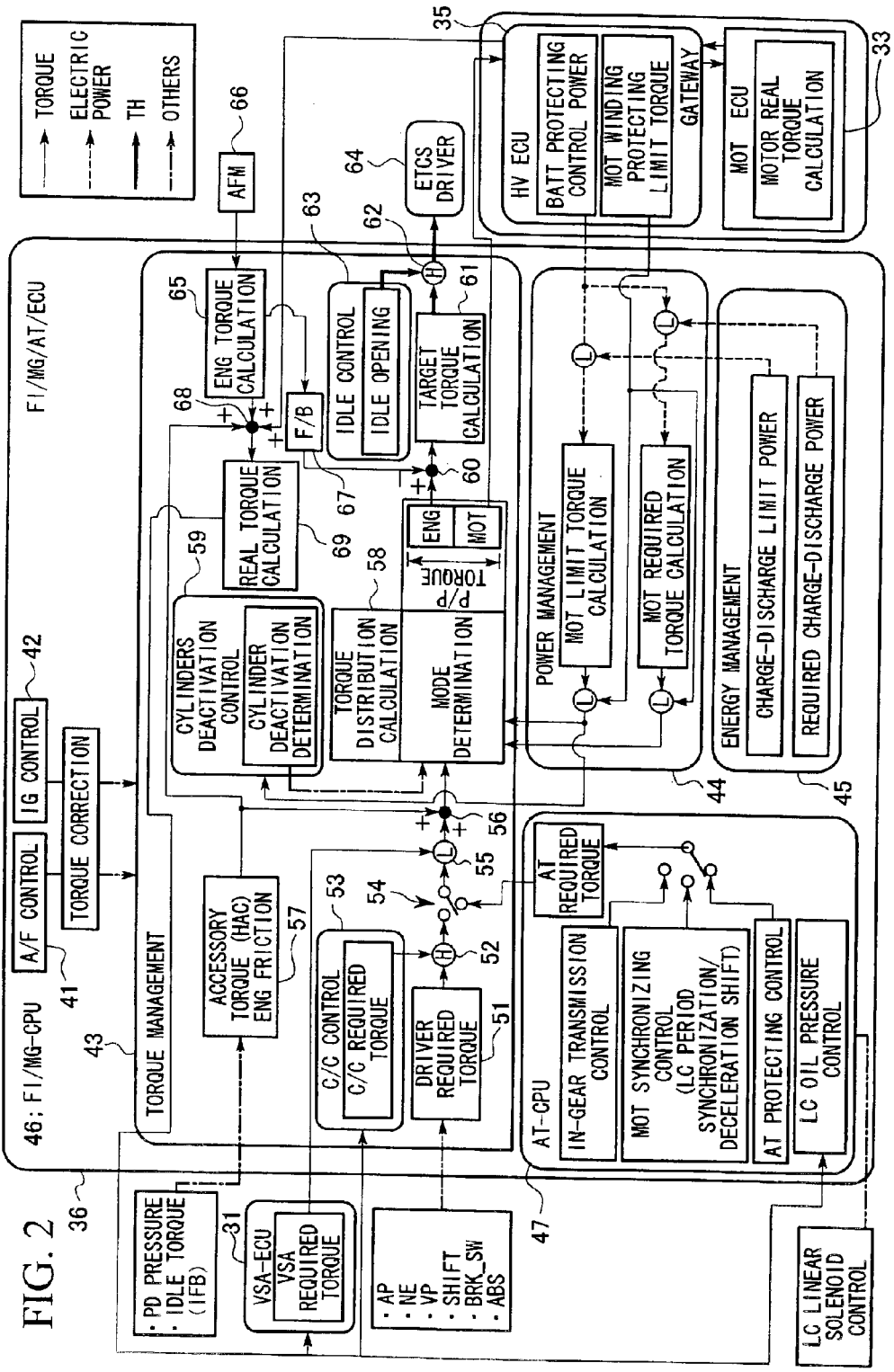
FIG. 2 is a block diagram of the control unit shown in FIG. 1.

For example, as shown in FIG. 2, the FI/AT/MGECU 36 comprises; a FI/MG-CPU 46 installed with an A/F (air/fuel ratio) control unit 41 and an IG (ignition) control unit 42 which control the fuel supply to and the ignition timing of the internal-combustion engine E, a torque management section 43, a power management section 44, and an energy management section 45; and for example an AT-CPU 47 which controls the shifting operation of the transmission T, the operating state of the lock-up clutch 2, and the like.

In the torque management section 43, a driver required torque calculating section 51 calculates the torque value required by a driver of the vehicle (driver required torque) depending on the operation amount of the accelerator by the driver, for example based on respective detection signals from the accelerator pedal (AP) opening, the engine speed NE, the vehicle travelling speed VP, the shift position SH, the operating state of a brake pedal BRK_SW, and the operating state ABS of an antilock brake system which prevents the driving wheels W from being locked during vehicle braking by the brake device 24, and outputs this torque value to a first torque selecting section 52.

Moreover, a C/C (cruise control) unit 53 calculates the torque value (C/C required torque) targeted during the travel control satisfying predetermined traveling conditions previously set according to the input operation of the driver, that is cruise control, for example, such as the constant speed travelling control which controls the internal-combustion engine E and the motor M so that the vehicle travelling speed VP detected in a vehicle speed sensor S1 becomes the target vehicle speed which is the target value of the travelling speed of the vehicle, and follow travel control for following a preceding vehicle while maintaining a predetermined vehicular gap, and outputs the torque value to the first torque selecting section 52.

The first torque selecting section 52 selects the greater torque value of the driver required torque or the C/C required torque, and outputs to the torque switching section 54. Therefore, for example even during cruise control, in the case where the driver required value according to the accelerator operation of the driver of the vehicle is over the C/C required torque, the torque according to the driver required value is output.

The torque switching section 54 selects either one of the torque value input from the first torque selecting section 52 and the AT required value input from the AT-CPU 47, and outputs to a second torque selecting section 55.

The AT-CPU 47 selects either one of the torque values as the AT required torque among, for example; a torque value set during the shifting operation of the transmission T, a torque value targeted when performing synchronizing control which synchronize the period of the input shaft of the transmission T and the rotation frequency of the motor M during driving the lock-up clutch 21 or shifting the speed such as shifting down, and a torque value set during protection control of the transmission T in the case where a driver operates the accelerator pedal and the brake pedal at the same time.

Moreover, the AT-CPU 47 electronically controls the oil pressure which drives the lock-up clutch 21 by an LC linear solenoid, and it is possible to set the operation, in addition to the LC_ON state where the lock-up clutch 21 is in the engagement state and the LC_OFF state where the engagement is cancelled, to an intermediate state which generates an appropriate smoothness in the lock-up clutch 21.

The second torque selecting section 55 selects the smaller torque value of the torque value input from the torque switching section 54 and the VSA required torque input from the VSAECU 31, then sets this torque value as a torque of the crankshaft (crankshaft torque), that is the target torque value with respect to the actual rotation of the driving wheels W, and outputs to a first adding section 56.

Moreover, an auxiliary torque-ENG friction calculating section 57 calculates, for example the auxiliary torque (HAC) required for driving the accessories based on the protrusive pressure (PD) of the air conditioner, calculates the torque value in relation to the engine (ENG) friction of the internal-combustion engine E based on the increased amount of the engine friction in a low temperature state compared to a standard for the engine friction value after termination of warming up of the internal-combustion engine E, and outputs to the first adding section 56.

The first adding section 56 sets the value obtained by adding the crank terminal torque and the torque value input from the auxiliary torque–ENG friction calculating section 57, as the power plant (P/P) torque which is the target torque with respect to the torque output from the power plant (that is, the internal-combustion engine E and the motor M), and outputs to a torque distribution calculating section 58.

The torque distribution calculating section 58 selects the required torque mode for instructing the predetermined operating state of the internal-combustion engine E and the motor M based on the cylinder deactivation determination output from the cylinder deactivation control unit 59 for determining whether the cylinder deactivation operation of the internal-combustion engine E should be executed or not, and the limit torque and the required torque with respect to the motor M output from the power management section 44, and according to the selection result, sets the distribution of the power plant torque (P/P) with respect to the respective torque instructions of the internal-combustion engine E and the motor M.

To the cylinder deactivation control unit 59 is input the limit torque for the motor M output from the power management section 44 described later, and according to the limit torque for the motor M, the cylinder deactivation control unit 59 determines whether the cylinder deactivation operation should be executed or not.

The power management section 44 calculates, for example the motor (MOT) limit torque based on the smaller power of the battery (BATT) protecting limit power output from the HVECU 35 and the charge-discharge limit power output from the energy management section 45, then sets the smaller one of the calculated motor limit torque and the motor (MOT) winding protecting limit torque output from the HVECU 35 as the limit torque, and outputs to the torque distribution calculating section 58 and the cylinder deactivation control unit 59.

Moreover, the power management section 44 calculates, for example the motor (MOT) limit torque based on the smaller power of the battery (BATT) protecting limit power output from the HVECU 35 and the required charge-discharge power output from the energy management section 45, then sets the smaller one of the calculated motor limit torque and the motor (MOT) winding protecting limit torque output from the HVECU 35 as the required torque, and outputs to the torque distribution calculating section 58.

The charge-discharge limit power and the required charge-discharge power output from the energy management section 45 are, for example the limited amount and the required amount with respect to charge and discharge set according to the state of charge of the battery 3 and the auxiliary battery 4.

Moreover, the battery (BATT) protecting limit power output from the HVECU 35 is, for example the limit value of the output power of the battery 3 set according to the temperature state of the battery 3, the auxiliary battery 4, and the other high voltage electrical equipment. The motor (MOT) winding protecting limit torque is the limit value of the output torque of the motor M set according to the temperature state of the motor M.

The torque instruction of the internal-combustion engine E calculated by the torque distribution calculating section 58 is input into a subtracting section 60. The subtracting section 60 inputs the value obtained by subtracting the torque value input from the feedback (F/B) processing section 67 described later from the torque instruction of the internal-combustion engine E, to a target TH calculating section 61. The target TH calculating section 61 calculates the target value for the electronic throttle opening TH in relation to the drive of the ETCS driver based on the input torque value, and outputs to a third torque selecting section 62.

The third torque selecting section 62 selects the greater throttle opening value of the target value of the electronic throttle opening TH input from the target TH and the idle opening output from the idle control unit 63, and outputs this throttle opening value to the ETCS driver 64.

The idle opening output from the idle control unit 63 is, for example, a limit value with respect to the throttle opening TH for preventing the engine speed NE from being less than the predetermined rotation frequency during the idle operation of the internal-combustion engine E.

Moreover, to the ENG torque calculating section 65 in the torque management section 43 is input a detection signal intake air amount (or supplied oxygen amount) of the internal-combustion engine E detected by an airflow meter (AFM) 66. The ENG torque calculating section 65 calculates the ENG torque output from the internal-combustion engine E based on the detection value of the intake air amount, and outputs to the feed back (F/B) processing section 67 and a second adding section 68.

The feed back (F/B) processing section 67, with respect to the torque instruction of the internal-combustion engine E calculated in the torque distribution calculating section 58, corrects for calculation errors of ENG torque based for example on the detection value of the airflow meter 66, response characteristic or aged deterioration of the internal-combustion engine E, performance irregularities during mass production of the internal-combustion engine E and the like, by feed back processing, and inputs the ENG torque calculated in the ENG torque calculating section 65 to the subtracting section 60.

A third adding section 68 inputs the torque value obtained by adding; the ENG torque calculated in the ENG torque calculating section 65, the torque value input from the auxiliary torque–ENG friction calculating section 57, and the motor real torque input from the MOTECU 33, to the real torque calculating section 69. The real torque calculating section 69 calculates the real torque value which is actually output from the power plant (that is, the internal-combustion engine E and the motor M) based on the input torque value.

To the MOTECU 33 is input the torque instruction of the motor M calculated by the torque distribution calculating section 58 in the torque management section 43, via the HVECU 35. The MOTECU 33 calculates the motor real torque which is actually output from the motor M based on the input torque value, and inputs to the third adding section 68 in the torque management section 43, via the HVECU 35.

Moreover, the real torque value calculated in the real torque calculating section 69 is input to the AT-CPU 47, and based on this real torque value, the oil pressure which drives the lock-up clutch 21 is electronically controlled by an LC linear solenoid.

The respective torque values calculated in the torque management section 43 are corrected according to the ignition timing, the air/fuel ratio, and the presence/absence of the fuel cut (fuel supply cancellation) of the internal-combustion engine E which are controlled in the A/F (air/fuel ratio) control unit 41 and the IG (ignition) control unit 42.

The control apparatus for a hybrid vehicle according to the present embodiment comprises the above construction. Next is a description of an operation of this control apparatus for a hybrid vehicle, particularly, an operation for setting the executing timing of the fuel cut (F/C) which temporally cancels the fuel supply to the internal-combustion engine E, and the executing timing of the F/C reset which restarts the fuel supply during execution of the fuel cut (F/C).

The power plant required torque final value TQPPRQF which is the requirement indicated value with respect to the power plant (P/P) torque input from the power plant to the transmission T, changes according to the accelerator pedal opening AP and the engine speed NE depending on the operation amount of the accelerator pedal by a driver. For example, as shown in FIG. 3, with respect to an appropriate engine speed NE, the power plant required torque final value TQPPRQF smoothly changes in an increasing trend from the AP time deceleration regeneration torque at zero TQAPMINF according to the increase in the accelerator pedal opening AP.

This power plant required torque final value TQPPRQF is distributed between the respective torque instructions of the internal-combustion engine E and the motor M, that is the engine required torque TQECMD, and the motor required torque TQMRUN.

Figure 3:
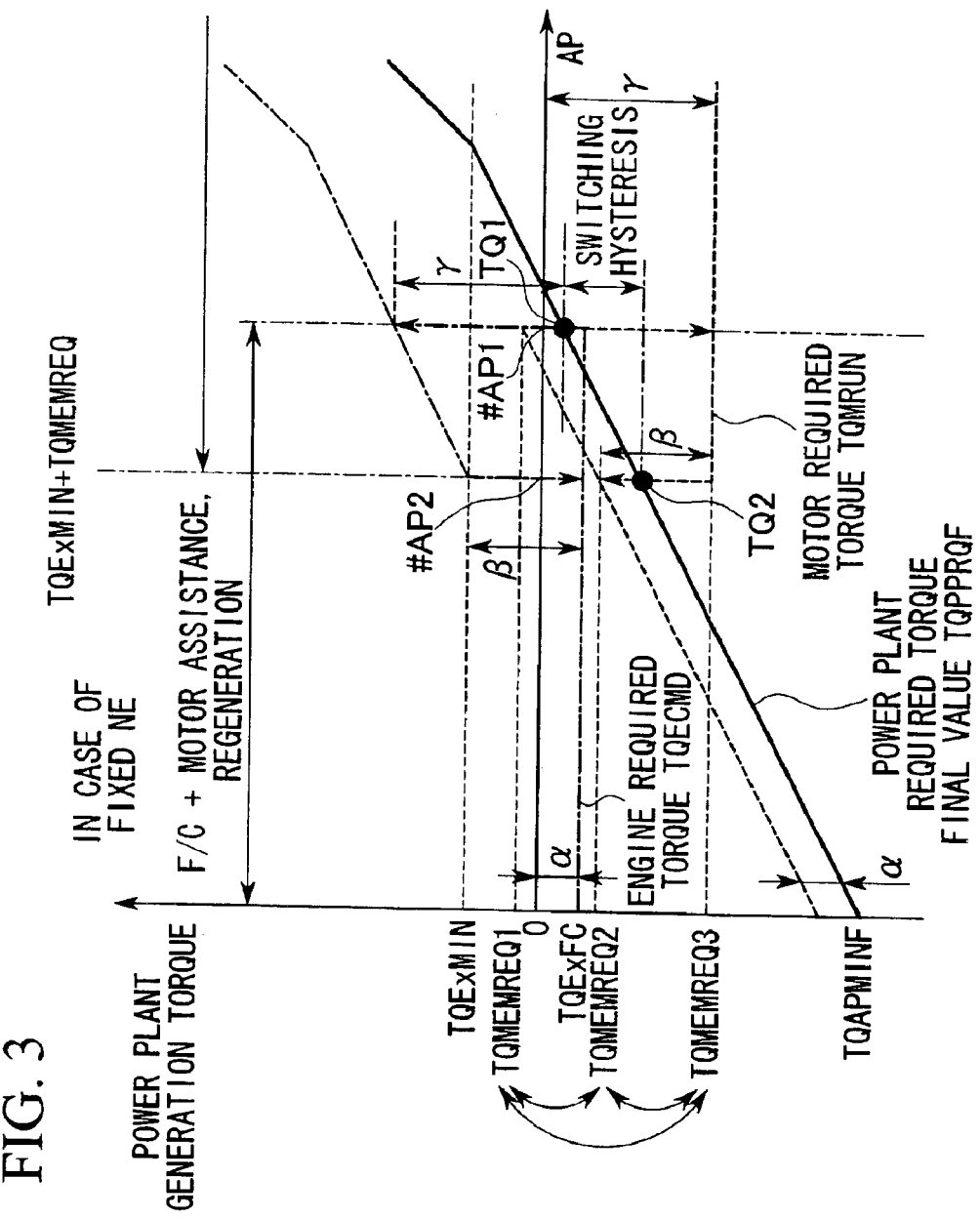
FIG. 3 is a graph showing the change in the energy management charge-discharge required torque TQMEMREQ, the engine required torque TQECMD, and the motor required torque TQMRUN accompanying a change in the accelerator pedal opening AP, with respect to the appropriate engine speed NE.

For example, if the accelerator pedal opening AP is less than the predetermined opening, then with respect to the internal-combustion engine E to which the fuel cut (F/C: fuel supply cancellation) is executed, before and after restart of the fuel supply accompanying the reset (F/C reset) from this fuel cut (F/C), that is restart of the internal-combustion engine E, for example as shown in FIG. 3, the engine required torque TQECMD rapidly changes from the engine torque during F/C TQExFC (where x=6 during F/C in the all cylinders operation, and x=3 during F/C in the cylinder deactivation operation) to the minimum engine torque TQExMIN (where x=6 in the all cylinders operation, and x=3 in the cylinder deactivation operation), with respect to the change in the accelerator pedal opening AP.

Therefore, the FI/AT/MGECU 36 in the control unit 1 controls the operating state of the motor M so as to reduce the rapid change of the engine required torque TQECMD due to the motor required torque TQMRUN, and sets so that the power plant required torque final value TQPPRQF can smoothly changes with respect to the accelerator pedal opening AP.

In FIG. 3, the torque on the positive rotation side of the driving wheels W is assumed to be positive.

Here, the FI/AT/MGECU 36 in the control unit 1, as described later, for example according to the state of charge SOC of the battery 3 and the vehicle travelling speed VP, calculates the EV travel capable battery terminal discharge power PWBEVRUN which is the dischargeable power from the battery 3 during the EV travel which is for traveling under the driving force from the motor M.

Furthermore, based on the calculated EV travel capable battery terminal discharge power PWBEVRUN and the predetermined limit value, the energy management charge-discharge required battery terminal power PWBEMREQ is calculated, and further the energy management charge-discharge required torque TQMEMREQ corresponding to the energy management charge-discharge required battery terminal power PWBEMREQ is calculated based on the predetermined PDU-MOT overall efficiency efima which is the conversion efficiency of the electric power and the motive power between the power drive unit 2 and the motor M, and the rotation frequency of the motor M, and the predetermined torque limit value for protecting the motor M.

Accordingly, the energy management charge-discharge required torque TQMEMREQ changes for example according to the energy state of the high voltage electrical equipment, the operating state of the vehicle, or the like. For example, in the case where it varies from the negative proper value being the charge side to the positive proper value being the discharge side, the motor torque of motor M capable of being output is increased. Consequently, the FI/AT/MGECU 36 enlarges the region which maintains the fuel cut (F/C) (for example, region with respect to the accelerator pedal opening AP and the engine speed NE) according to the increased amount of the motor torque. In this enlarged state, in the case where the power plant required torque final value TQPPRQF is increased within the predetermined range, for example the regeneration amount during the regenerative operation of the motor M is decreased, or for example the output during the power running operation of the motor M is increased.

For example, as shown in FIG. 3, accompanying the gradual increase of the accelerator pedal opening AP while executing the fuel cut (F/C), when increasing the power plant required torque final value TQPPRQF, the engine required torque TQECMD becomes the predetermined engine torque during F/C TQExFC (where x=6 during F/C in the all cylinders operation, and x=3 during F/C in the cylinder deactivation operation). Therefore, the motor required torque TQMRUN is increased to the energy management charge-discharge required torque TQMEMREQ which is the motor torque of the motor M capable of being output. At this time, if the value of the energy management charge-discharge required torque TQMEMREQ is set, for example to the first energy management charge-discharge required torque TQMEMREQ 1 shown in FIG. 3, the fuel cut (F/C) is maintained until the accelerator pedal opening AP reaches to the predetermined first accelerator pedal opening #AP1, or until the power plant required torque final value TQPPRQF reaches to the first required torque TQ1 corresponding to the first accelerator pedal opening #AP1.

Moreover, for example in the deceleration regeneration state or the like, the value of the energy management charge-discharge required torque TQMEMREQ is set, for example to the third energy management charge-discharge required torque TQMEMREQ 3 shown in FIG. 3. In the state where this predetermined third energy management charge-discharge required torque TQMEMREQ 3 is set to the motor required torque TQMRUN, when the power plant required torque final value TQPPRQF is decreased accompanying the gradual decrease of the accelerator pedal opening AP, the engine required torque TQECMD is gradually decreased.

At this time, the accelerator pedal opening AP reaches to the predetermined second accelerator pedal opening #AP2 and the power plant required torque final value TQPPRQF reaches to the second required torque TQ2 corresponding to the second accelerator pedal opening #AP2, so as to cancel the fuel supply to the internal-combustion engine E to give the fuel cut (F/C) state when the engine required torque TQECMD reaches to the predetermined minimum engine torque TQExMIN (where x=6 in the all cylinders operation, and x=3 in the cylinder deactivation operation), and the value of the energy management charge-discharge required torque TQMEMREQ is then set, for example to the second energy management charge-discharge required torque TQMEMREQ 2 shown in FIG. 3.

Then, when the accelerator pedal opening AP becomes less than the predetermined second accelerator pedal opening #AP 2, the engine required torque TQECMD becomes the predetermined engine torque during F/C TQExFC (where x=6 during F/C in the all cylinders operation, and x=3 during F/C in the cylinder deactivation operation), and the motor required torque TQMRUN is changed to the decreasing trend from the predetermined the second energy management charge-discharge required torque TQMEMREQ 2 accompanying the decrease of the power plant required torque final value TQPPRQF.

Hereunder is a description with reference to the flowcharts, of a processing which calculates the EV travel capable discharge power at the input-output terminals of the battery 3 set according to the energy state of the high voltage electrical equipment (for example, in FIG. 1, the input-output terminals connected with the power drive unit 2, the downverter 5, and the air condition inverter 7), that is, the EV travel capable battery terminal discharge power PWBEVRUN which is the discharge power enabling the vehicle to travel under the driving force from the motor M.

Figure 4:
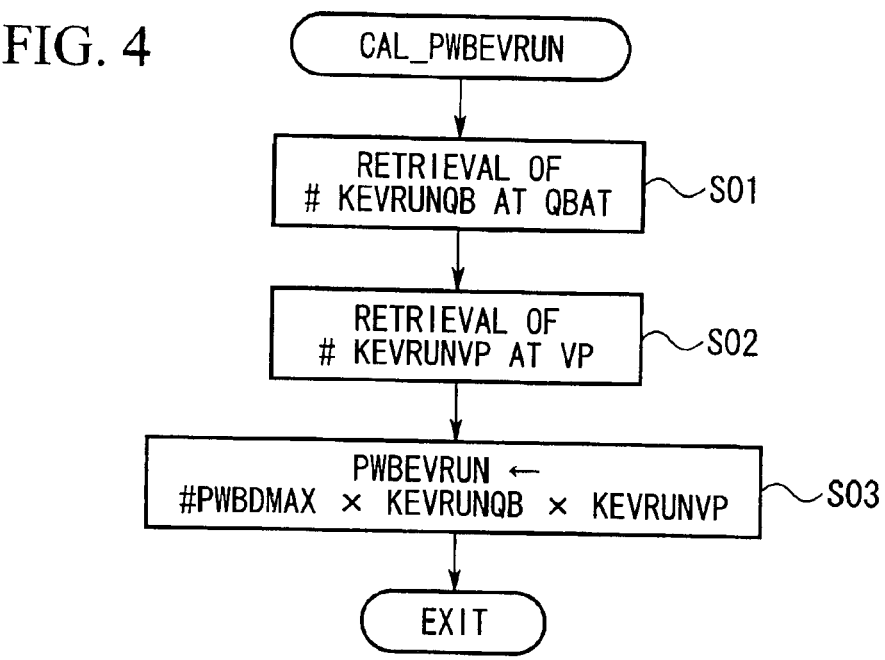
FIG. 4 is a flowchart showing the processing which calculates the EV travel capable battery terminal discharge power PWBEVRUN.
Figure 5:
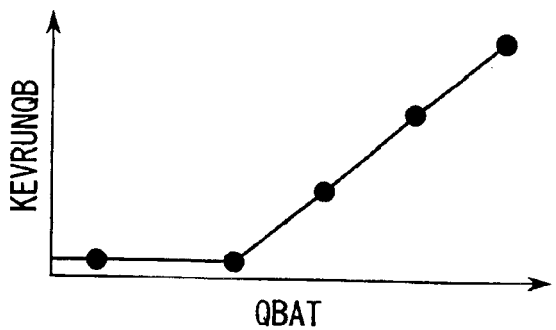
FIG. 5 is a graph showing the EV travel capable discharge power state of charge correction coefficient KEVRUNQB changed to an increasing trend accompanying an increase of the state of charge QBAT of the battery

Firstly, in step S01 shown in FIG. 4, for example as shown FIG. 5, a table #KEVRUNQB of the EV travel capable discharge power of the state of charge correction coefficient KEVRUNQB changed in an increasing trend accompanying the increase of the state of charge QBAT of the battery 3, is retrieved, so as to set the EV travel capable discharge power of the state of charge correction coefficient KEVRUNQB.

Figure 6:
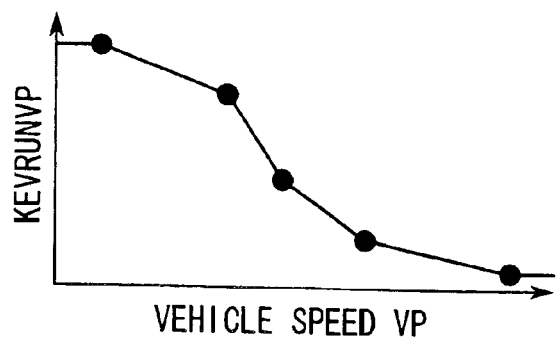
FIG. 6 is a graph showing the EV travel capable discharge power vehicle speed correction coefficient KEVRUNVP changed to a decreasing trend accompanying an increase of the vehicle travelling speed VP.

Next, in step S02, for example as shown FIG. 6, a table #KEVRUNVPT of the EV travel capable discharge power vehicle speed correction coefficient KEVRUNVP changed in a decreasing trend accompanying the increase of the vehicle travelling speed VP, is retrieved, so as to set the EV travel capable discharge power vehicle speed correction coefficient KEVRUNVP.

Then in step S03, the value obtained by multiplying a predetermined battery maximum discharge power #PWBDMAX, that is the rated discharge power of the battery 3, by the EV travel capable discharge power state of charge correction coefficient KEVRUNQB and the EV travel capable discharge power vehicle speed correction coefficient KEVRUNVP, is set to the EV travel capable battery terminal discharge power PWBEVRUN, and the series of processing is terminated.

Hereunder is a description of a processing which calculates the energy management charge-discharge required battery terminal power PWBEMREQ, with reference to the flowcharts.

Figure 7:
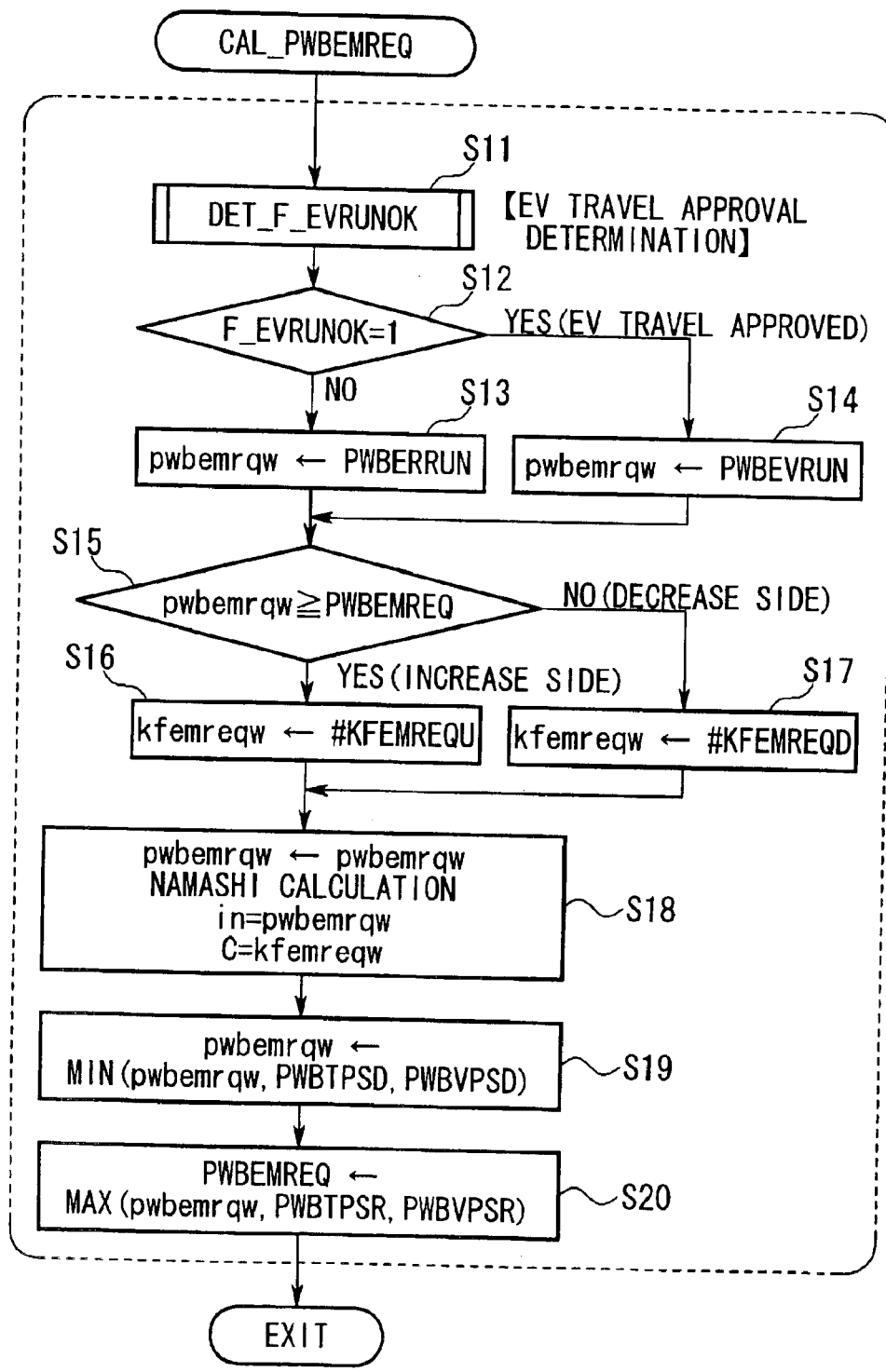
FIG. 7 is a flowchart showing the processing which calculates the energy management charge-discharge required battery terminal power PWBEMREQ.

Firstly, in step S11 shown in FIG. 7, an EV travel approval determination processing EV described later, that is a processing which determines whether the vehicle can travel under the driving force of the motor M or not, is executed.

Next, in step S12, it is determined whether the flag value of the EV travel approval flag F_EVRUNOK which approves vehicle travel under the driving force of the motor M is "1" or not.

If this determination is "NO", that is in the case of EV travel disapproval, the flow proceeds to step S13, where for example the target charge-discharge battery terminal power during the travel of vehicle PWBERRUN obtained by retrieval from a predetermined map or the like, is set to the energy management charge-discharge required power (present value) pwbemrqw, and the flow proceeds to step S15 described later.

On the other hand, if this determination is "YES", that is in the case of EV travel approval, the flow proceeds to step S14, where the EV travel capable battery terminal discharge power PWBEVRUN is set to the energy management charge-discharge required power (present value) pwbemrqw, and the flow proceeds to step S15 described later.

In step S15, it is determined whether the energy management charge-discharge required power (present value) pwbemrqw is more than the energy management charge-discharge required battery terminal power PWBEMREQ calculated in the previous processing or not.

If this determination is "YES", that is in the case of the increase side, the flow proceeds to step S16, where a predetermined increase side coefficient KFEMREU is set to a coefficient kfemreqw for the first order filter processing, and the flow proceeds to step S18 described later.

On the other hand, if this determination is "NO", that is in the case of the decrease side, the flow proceeds to step S17, where a predetermined increase side coefficient KFEMREU is set to the coefficient kfemreqw for the first order filter processing, and the flow proceeds to step S18 described later.

In step S18, the first order filter processing for suppressing the rapid torque fluctuation with respect to the energy management charge-discharge required power (present value) pwbemrqw is executed.

Next, in step S19, the smaller value of the energy management charge-discharge required power (present value) pwbemrqw, the battery temperature suppressing discharge power limit PWBTPSD, and the battery voltage protecting discharge power limit PWBVPSD is newly set to the energy management charge-discharge required power (present value) pwbemrqw so as to execute the target charge-discharge power upper limit processing during travel of the vehicle.

Next, in step S20, the greater value of the energy management charge-discharge required power (present value) pwbemrqw, the battery temperature suppressing charge power limit PWBTPSR, and the battery voltage protecting charge power limit PWBVPSR is newly set to the energy management charge-discharge required battery terminal power PWBEMREQ so as to execute the target charge-discharge power lower limit processing during travel of the vehicle, and the series of processing are terminated.

If the sign for the discharge power is positive, the battery temperature suppressing charge power limit PWBTPSR and the battery voltage protecting charge power limit PWBVPSR becomes negative. Therefore, selecting the maximum value in step S20 is equivalent to selecting the minimum absolute value of the energy management charge-discharge required power (present value) pwbemrqw, the battery temperature suppressing charge power limit PWBTPSR, and the battery voltage protecting charge power limit PWBVPSR.

Hereunder is a description of the EV travel approval determination processing in above step S11, with reference to the flowcharts.

Figure 8:
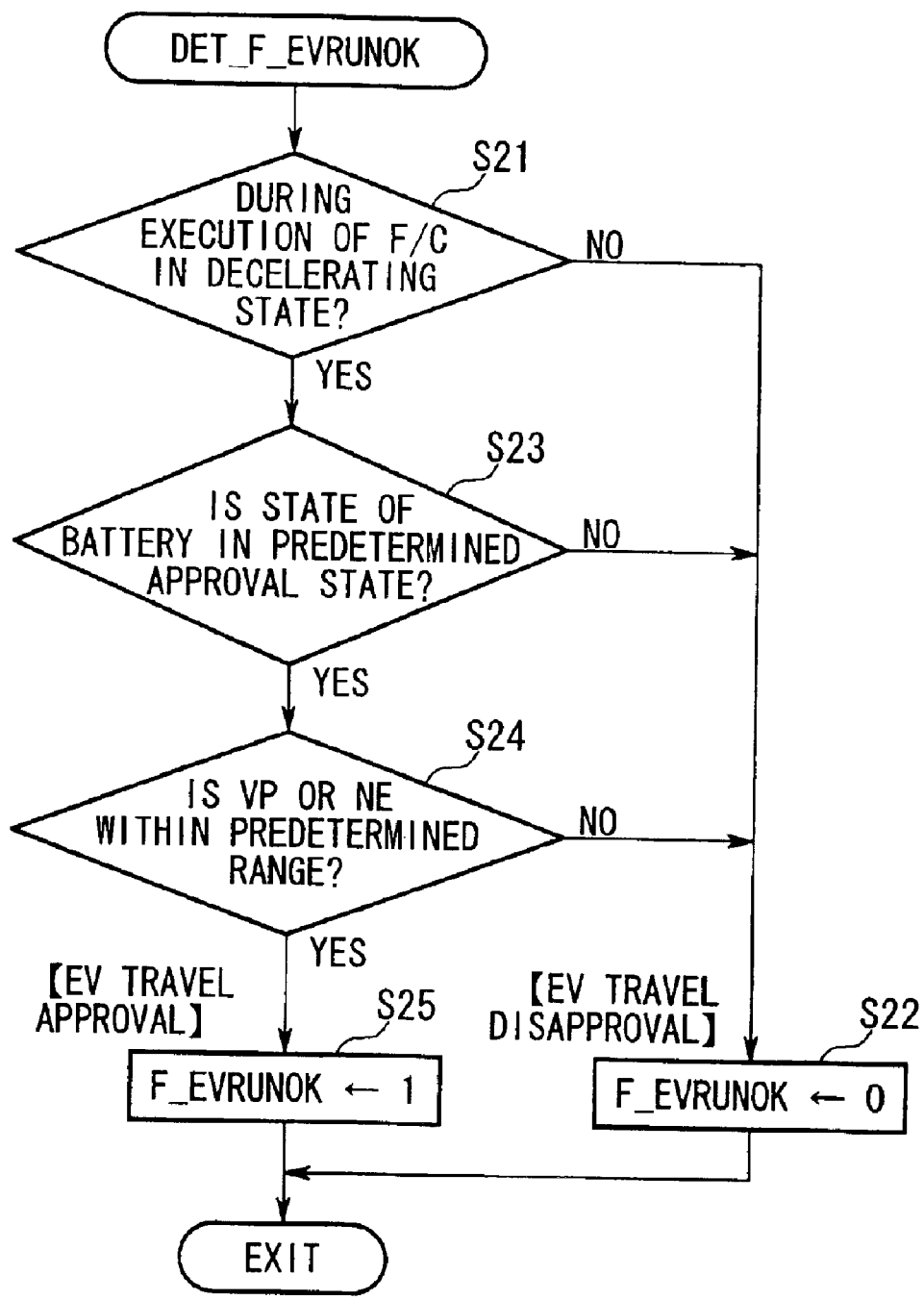
FIG. 8 is a flowchart showing the EV travel approval determination processing.

Firstly in step S21 shown in FIG. 8, it is determined whether F/C is being executed with the vehicle in the decelerating state or not.

If this determination is "YES", the flow proceeds to step S23 described later.

On the other hand, if this determination is "NO", the flow proceeds to step S22, where "0" is set to the flag value of the EV travel approval flag F_EVRUNOK which approves vehicle travel under the driving force of the motor M, and the series of processing is terminated.

In step S23, it is determined whether the state of the battery 3 is in a predetermined approval state, that is a state where it is possible to supply the desired power to the motor M when the vehicle travels under the driving force of the motor M, or not.

If this determination is "NO", the flow proceeds to step S22 described above.

On the other hand, if this determination is "YES", the flow proceeds to step S24

In step S24, it is determined whether the vehicle travelling speed VP is within a predetermined range, the shift position SH is over a predetermined position, and the engine speed NE is within a predetermined range, that is whether the vehicle is in the desired travelling state required when the vehicle travels under the driving force of the motor M, or not.

When in step S24 the determination is "NO", the flow proceeds to step S22 mentioned above.

On the other hand, when in step S24 the determination is "YES", the flow proceeds to step S25.

In step S25, a "1" is set to the flag value of the EV travel approval flag F_EVRUNOK and the series of processing are terminated.

Hereunder is a description of a processing which calculates the energy management charge-discharge required torque TQMEMREQ according to energy management charge-discharge required battery terminal power PWBEMREQ, with reference to the flowcharts.

Figure 9:
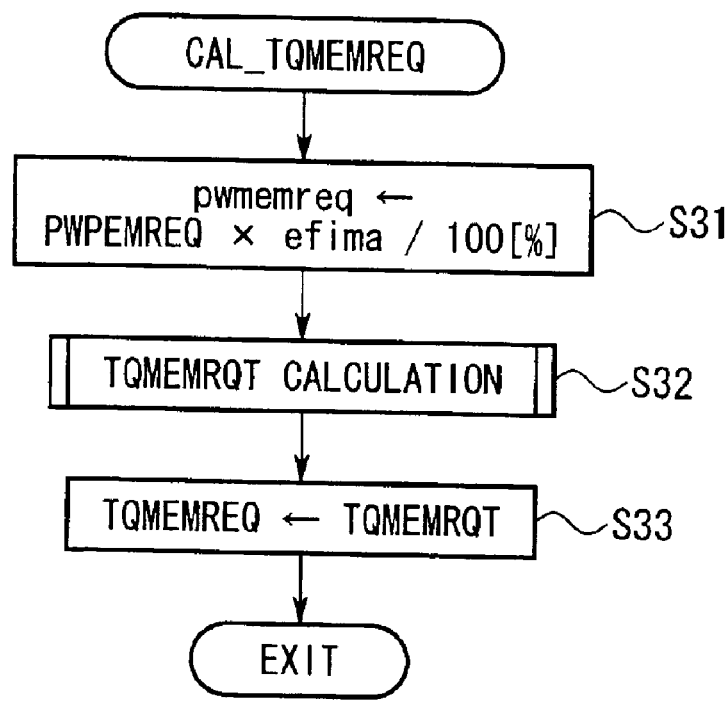
FIG. 9 is a flowchart showing the processing which calculates the energy management charge-discharge required torque TQMEMREQ.

Firstly, in step S31 shown in FIG. 9; the energy management charge-discharge required PDU terminal power PWPEMREQ set as a value obtained by subtracting, for example the high voltage accessory load power which is the power consumption of the various accessories of 12 volts, from the value obtained by executing the predetermined feed back to the energy management charge-discharge required battery terminal power PWBEMREQ; that is the charge-discharge required power at the input-output terminals of the power drive unit (PDU) 2 (for example, input-output terminals connected with the battery 3, the downverter, and the air condition inverter 7 in FIG. 1) set according to the energy state of the high voltage electrical equipment system, is multiplied by the predetermined PDU-MOT overall efficiency efima which is the conversion efficiency of the electric power and the motive power between the power drive unit 2 and the motor M, and the value obtained thereby is set as the energy management charge-discharge required shaft output pwmemreq which is the output with respect to the rotation shaft of the motor M. The PDU-MOT overall efficiency efima is calculated based on, for example the energy management charge-discharge required PDU terminal power PWPEMREQ, the rotation frequency of the motor M, and the input power of the power drive unit 2.

Next, in step S32, as described later, for example, based on the energy management charge-discharge required shaft output pwmemreq which is the power value, and the rotation frequency of the motor M, the torque at the shaft end of the crankshaft (crank end), that is the rotation shaft of the motor M is calculated. With respect to the calculated torque, upper-lower limit processing is performed based on the motor protecting drive torque limit TQMPRTD for protecting the motor M when driving and the motor protecting regenerative torque limit TQMPRTR for protecting the motor M during the regenerative operation. Then, the energy management required power conversion value TQMEMRQT obtained by converting the energy management charge-discharge required shaft output pwmemreq which is the power value, into the torque value, is calculated.

Then, in step S33, the energy management required power conversion value TQMEMRQT is set to the energy management charge-discharge required torque TQMEMREQ, and the series of processing is terminated.

Hereunder is a description of a processing which calculates the energy management required power conversion value TQMEMRQT in step S32 described above, with reference to the flowcharts.

Figure 10:
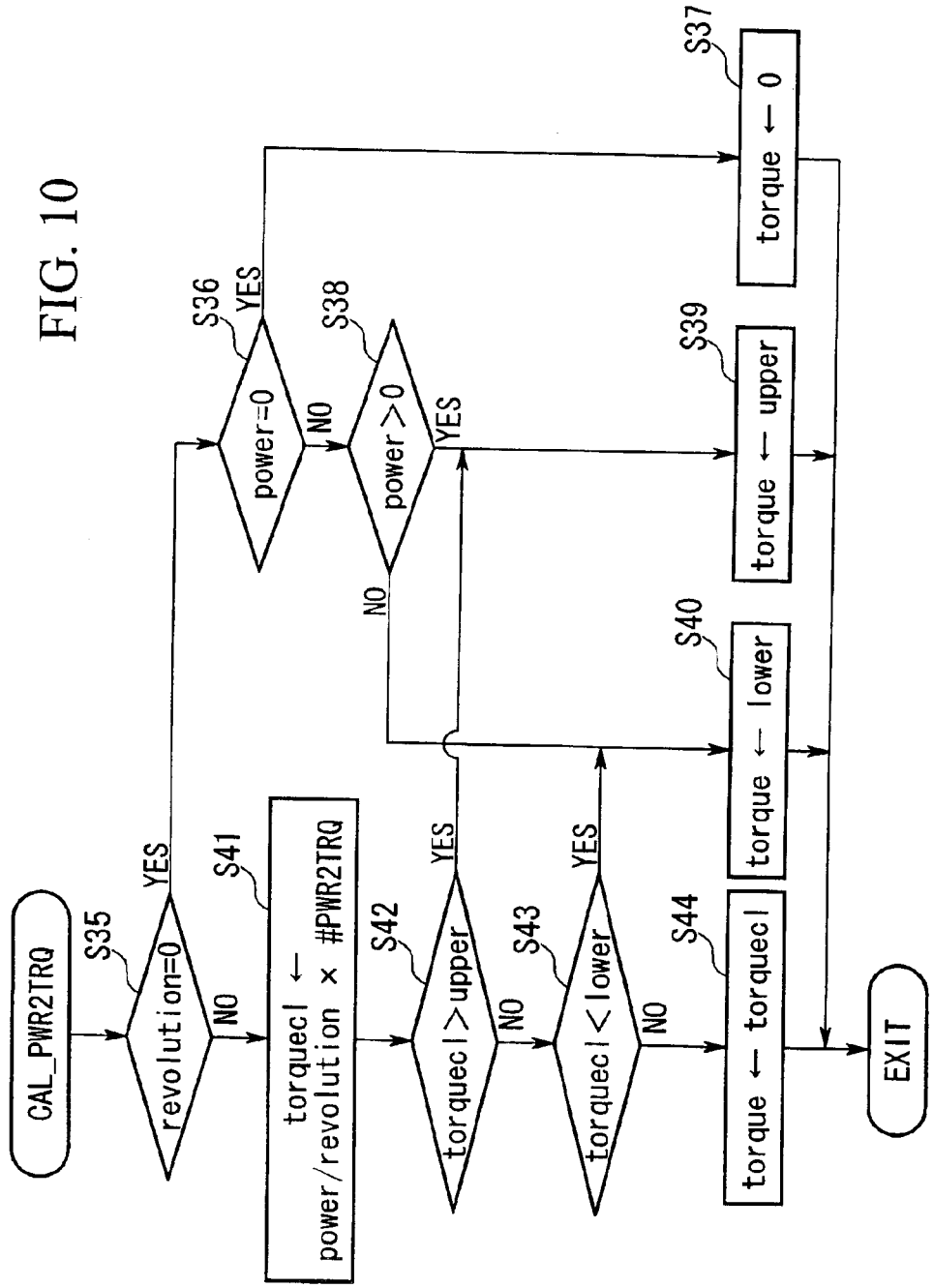
FIG. 10 is a flowchart showing the processing which calculates the energy management required power conversion value TQMEMRQT.

In the processing shown in FIG. 10, using the output (power), the period (revolution), and the upper limit value (upper) and the lower limit value (lower) as the parameters, and the torque (torque) as the returning value, the torque at the shaft end is calculated. Then, the upper-lower limit processing is performed for the calculated torque.

Firstly in step S35 shown in FIG. 10, it is determined whether the period (revolution) (equivalent to the rotation frequency of the motor M) is zero or not.

If this determination is "NO", the flow proceeds to step S41 described later.

On the other hand, if this determination is "YES", the flow proceeds to step S36.

In step S36, it is determined whether the output (power) (equivalent to the energy management charge-discharge required shaft output pwmemreq) is zero or not.

If this determination is "NO", the flow proceeds to step S38 described later.

On the other hand, if this determination is "YES", the flow proceeds to step S37, where zero is set to the torque (torque) (equivalent to the energy management required power conversion value TQMEMRQT), and the series of processing is terminated.

Moreover, in step S38, it is determined whether the output (power) (equivalent to the energy management charge-discharge required shaft output pwmemreq) is greater than zero or not.

If this determination is "YES", the flow proceeds to step S39, where the upper limit (upper) (equivalent to the motor protecting drive torque limit TQMPRTD) is set to the torque (torque) (equivalent to the energy management required power conversion value TQMEMRQT), and the series of processing is terminated.

On the other hand, if this determination is "NO", the flow proceeds to step S40, where the lower limit (lower) (equivalent to the motor protecting regenerative torque limit TQMPRTR) is set to the torque (torque) (equivalent to the energy management required power conversion value TQMEMRQT), and the series of processing is terminated.

Moreover, in step S41, a value obtained by dividing the output (power) by the period (revolution) is multiplied by a predetermined unit conversion factor # PWR2TRQ, and the obtained value is set to the torque value torquecl.

Next, in step S42, it is determined whether the torque value torquecl is greater than the upper value (upper) or not.

If this determination is "YES", the flow proceeds to step S39 described above.

On the other hand, if this determination is "NO", the flow proceeds to step S43.

Next, in step S43, it is determined whether the torque value torquecl is less than the lower value (lower) or not.

If this determination is "YES", the flow proceeds to step S40 described above.

On the other hand, if this determination is "NO", the flow proceeds to step S44, where the torque value torquecl is set to the torque (torque) (equivalent to the energy management required power conversion value TQMEMRQT), and the series of processing is terminated.

Hereunder is a description of a processing which sets the engine required torque TQECMD and the motor required torque TQMRUN according to the energy management charge-discharge required torque TQMEMREQ, with reference to the flowcharts.

Figure 11:
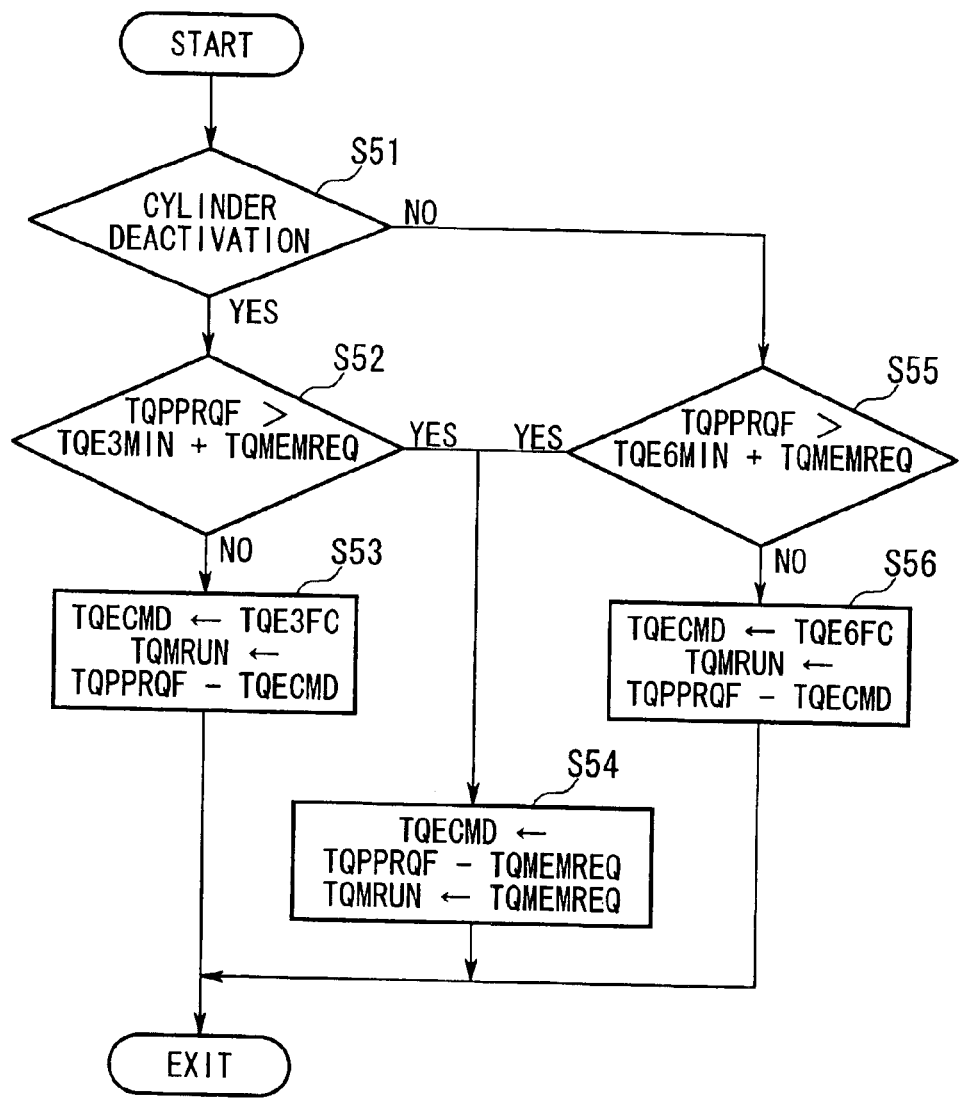
FIG. 11 is a flowchart showing the processing which sets the engine required torque TQECMD and the motor required torque TQMRUN according to the energy management charge-discharge required torque TQMEMREQ.

Firstly, in step S51 shown in FIG. 11, it is determined whether the internal-combustion engine E is in the state of cylinder deactivation operation or not.

If this determination is "NO", the flow proceeds to step S55 described later.

On the other hand, if this determination is "YES", the flow proceeds to step S52.

In step S52, it is determined whether the power plant required torque final value TQPPRQF is greater than the value obtained by adding the minimum engine torque (cylinder deactivation) TQE3MIN and the energy management charge-discharge required torque TQMEMREQ, or not.

If this determination is "NO", the flow proceeds to step S53, where the engine torque during F/C TQE3FC (cylinder deactivation) is set to the engine required torque TQECMD so as to execute the fuel cut (F/C) of the internal-combustion engine E. Then the value obtained by subtracting the engine required torque TQECMD from the power plant required torque final value TQPPRQF is set to the motor required torque TQMRUN, and the series of processing is terminated.

On the other hand, if this determination is "YES", the flow proceeds to step S54, where the value obtained by subtracting the energy management charge-discharge required torque TQMEMREQ from the power plant required torque final value TQPPRQF is set to the engine required torque TQECMD so as to execute the fuel supply to the internal-combustion engine E. Then the energy management charge-discharge required torque TQMEMREQ is set to the motor required torque TQMRUN, and the series of processing is terminated.

Moreover, in step S55, it is determined whether the power plant required torque final value TQPPRQF is greater than the value obtained by adding the minimum engine torque (all cylinder) TQE6MIN and the energy management charge-discharge required torque TQMEMREQ, or not.

If this determination is "YES", the flow proceeds to step S54 described above.

On the other hand, if this determination is "NO", the flow proceeds to step S56, where the engine torque during F/C TQE6FC (all cylinder) is set to the engine required torque TQECMD so as to execute the fuel cut (F/C). Then the value obtained by subtracting the engine required torque TQECMD from the power plant required torque final value TQPPRQF is set to the motor required torque TQMRUN, and the series of processing is terminated.

As described above, according to the control apparatus for a hybrid vehicle in the embodiment of the present invention, for example based on the state of charge SOC of the battery 3, the vehicle travelling speed VP (or, the shift position SH or the engine speed NE), the energy state in the high voltage electrical equipment system such as the executing state of the fuel cut (F/C), and the operating state of the vehicle, and further the PDU-MOT overall efficiency efima and the rotation frequency of the motor M and the predetermined torque limit value for protecting the motor M, the energy management charge-discharge required torque TQMEMREQ which is the motor torque capable of being output is set. As a result, for example, the internal-combustion engine E may be kept from being restarted unnecessarily, and the fuel consumption efficiency may be improved while maintaining the desired driving force by the EV travel.

Moreover, when executing the fuel cut (F/C), not only is it set as to whether the regenerative operation of the motor M is to be performed or not, but also the regenerative amount may be controlled with respect to the regenerative operation, and the power running operation of the motor M becomes possible, so that the travelling state of the vehicle can be diversified, enabling appropriate reflection of the driver's intention with respect to the travelling behavior of the vehicle.

As described above, according to the control apparatus for a hybrid vehicle of the present invention described in the first aspect, the operation of the internal-combustion engine can be canceled and the fuel consumption efficiency can be improved while maintaining the desired torque. Furthermore, even in the cancellation state of the fuel supply, by changing the motor torque required value, the regeneration amount and the driving force of the motor can be changed, so that the driver's intention can be appropriately reflected with respect to the travelling state of the vehicle.

Furthermore, according to the control apparatus for a hybrid vehicle of the present invention described in the second aspect, even while the vehicle is travelling, the operation of the internal-combustion engine can be properly canceled and the fuel consumption efficiency can be improved. Furthermore, in addition to the determination result by the EV travel determination device, by executing the EV travel according to the EV travel capable upper limit motor torque calculated based on the energy state of the high voltage electrical equipment, the travelling state of the vehicle, the power consumption of the accessories, and the conversion efficiency of the electric power and the motive power, the driver's intention can be appropriately reflected with respect to the travelling state of the vehicle while maintaining the desired torque.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A control apparatus for a hybrid vehicle which comprises an internal-combustion engine and a motor as a power source, and a power storage unit which transfers electric energy with said motor, and at least one of said internal-combustion engine and said motor is connected to driving wheels of the vehicle through a transmission so as to transmit a driving force to said driving wheels, wherein said control apparatus comprises:

a motor chargeable-dischargeable torque calculating device which calculates a motor chargeable-dischargeable torque which is the motor torque capable of being output from said motor corresponding to the chargeable-dischargeable power in said power storage unit, according to the energy state in high voltage electrical equipment constituting said power storage unit and accessories;

a fuel supply canceling device which cancels the fuel supply to said internal-combustion engine in the case where a target torque with respect to a crank end torque which is the torque at the shaft end of the crankshaft, of the power plant torque output from the power plant comprising said internal-combustion engine and said motor, is less than a value obtained by adding said motor chargeable-dischargeable torque and a minimum engine torque capable of being output from said internal-combustion engine; and a motor required torque setting device which sets a motor required torque which is a required value with respect to said motor torque according to said target torque when the fuel supply to said internal-combustion engine is cancelled by said fuel supply cancellation.

2. A control apparatus for a hybrid vehicle according to claim 1, comprising;

a power storage unit state detecting device which detects the state of said power storage unit;

a vehicle state detecting device which detects the state of said vehicle;

an EV travel determination device which determines whether it is possible to execute EV travel which makes the vehicle travel under the driving force of said motor by means of discharge power of said power storage unit or not, based on the state of said power storage unit detected by said power storage unit state detecting device and the state of said vehicle detected by said vehicle state detecting device;

a power calculating device which calculates the dischargeable power at input-output terminals of said power storage unit in an executing state of said EV travel according to the energy state of said high voltage electrical equipment and the travelling state of the vehicle;

an upper limit motor torque calculating device which calculates an EV travel capable upper limit motor torque which is an upper limit in the executing state of said EV travel by calculating a value obtained by subtracting the power consumption of said accessories from said dischargeable power, using the conversion efficiency of the electric power and the motive power; and an EV travel controlling device which controls said EV travel in the case where the execution of EV travel is approved by said EV travel determination device and said target torque is less than the value obtained by adding said EV travel capable upper limit motor torque and said minimum engine torque.

* * * * *